United States Patent
Tibay et al.

[11] Patent Number: 6,135,479
[45] Date of Patent: Oct. 24, 2000

[54] TRICYCLE PUSHING DEVICE

[76] Inventors: Richard A. Tibay; Cynthia M. Tibay, both of 2471 Yeovil Road, Mississauga, Ontario, Canada, L5J 2G1

[21] Appl. No.: 09/335,168

[22] Filed: Jun. 17, 1999

[51] Int. Cl.[7] .................................................. B62J 39/00
[52] U.S. Cl. ................ 280/288.4; 280/282; 280/292; 280/293; 280/304.5; 294/15; 294/19.1
[58] Field of Search ....................... 280/292, 293, 280/304.5, 288.4, 282; 294/19.1, 15

[56] References Cited

U.S. PATENT DOCUMENTS

| | | | |
|---|---|---|---|
| 2,630,334 | 3/1953 | Ewers | 280/289 |
| 2,672,351 | 3/1954 | Kane | 280/289 |
| 3,485,507 | 12/1969 | Christof | 280/202 |
| 3,653,624 | 4/1972 | Abel | 248/312 |
| 3,772,742 | 11/1973 | Gigante | 248/231.81 |
| 3,773,288 | 11/1973 | Bolton | 248/214 |
| 4,750,252 | 6/1988 | Homeyer | 29/426.6 |
| 4,802,391 | 2/1989 | Willhoite et al. | 81/488 |
| 5,028,066 | 7/1991 | Garth | 280/282 |
| 5,217,240 | 6/1993 | Gardenhour, Jr. et al. | 280/282 |
| 5,306,030 | 4/1994 | Becka | 280/282 |
| 5,558,348 | 9/1996 | Becka | 280/282 |
| 5,577,750 | 11/1996 | Sklar | 280/293 |
| 5,882,027 | 3/1999 | Tevis | 280/433 |

*Primary Examiner*—Brian L Johnson
*Assistant Examiner*—Deanna Draper

[57] ABSTRACT

A tricycle pushing device for pushing a child's tricycle therewith. The tricycle pushing device includes an elongate shaft having opposite proximal and distal ends with a pushing head coupled to the distal end of the shaft. The pushing head has a generally U-shaped upper portion and a lower portion. The upper portion of the pushing head comprises a spaced apart and substantially parallel pair of elongate fingers defining a generally U-shaped slot therebetween designed for receiving therein a rear post of a tricycle. The lower portion of the pushing head has front, intermediate and rear regions. The front and rear regions are spaced apart from one another to define a space therebetween designed for receiving therein a perimeter lip downwardly depending from a foot kick plate of a tricycle.

19 Claims, 3 Drawing Sheets

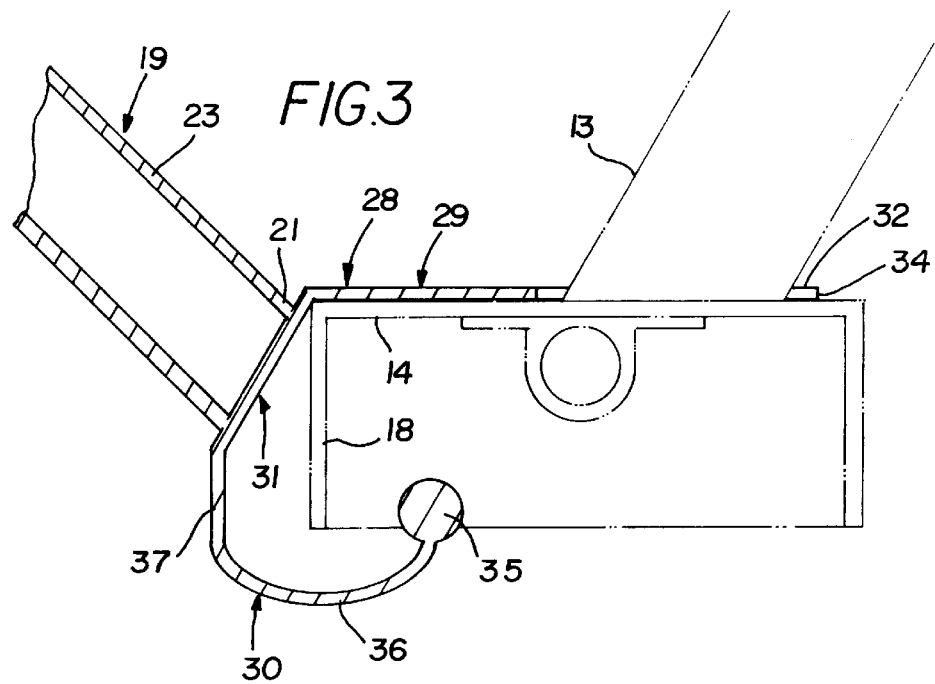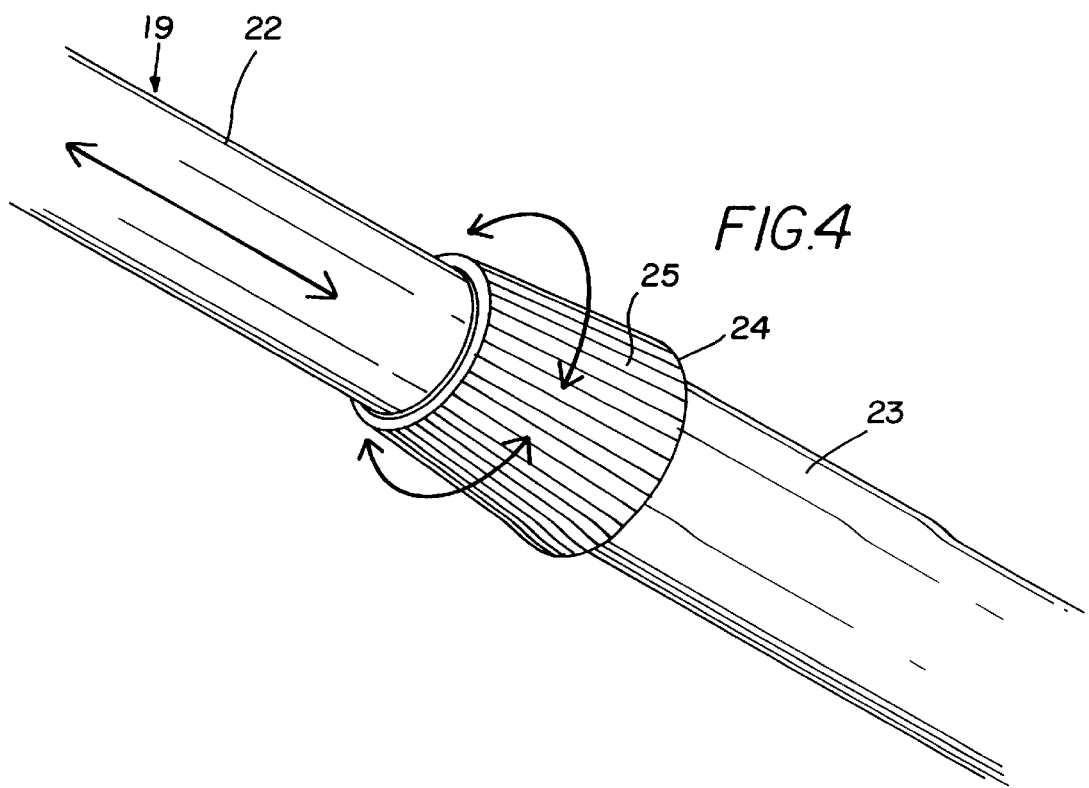

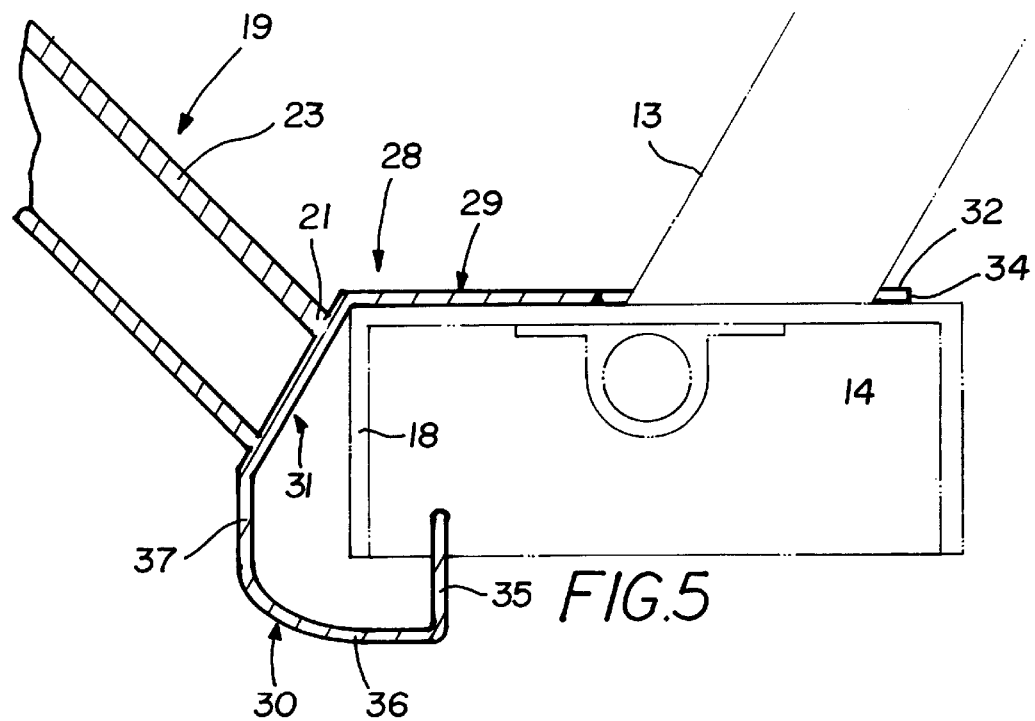
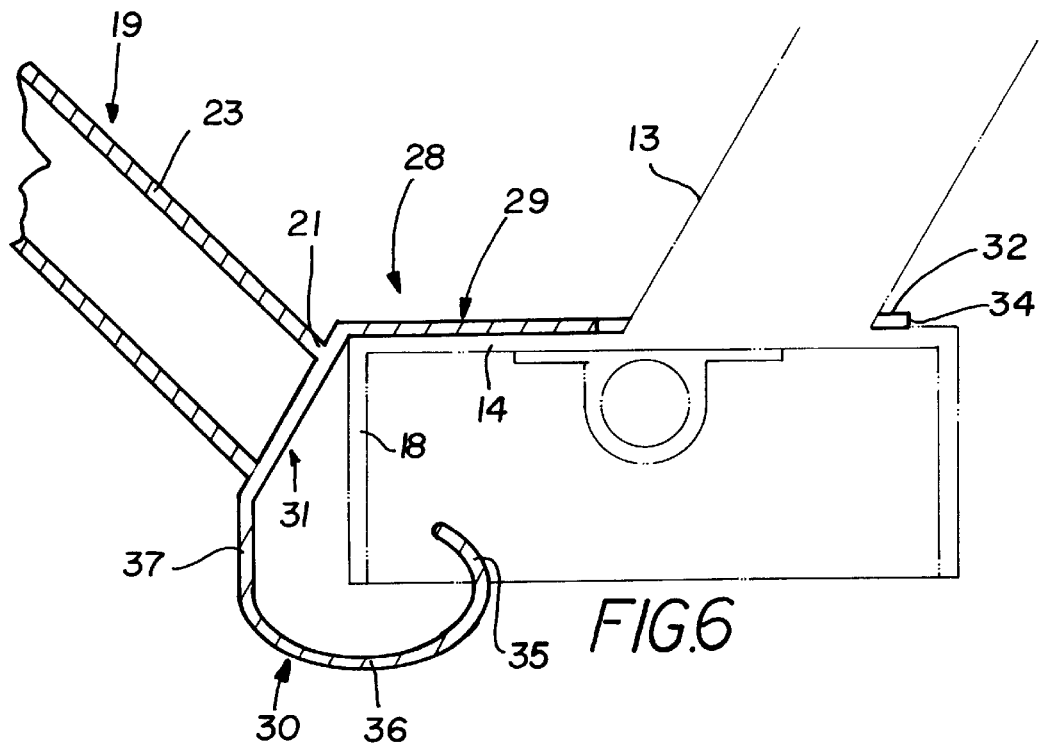

TRICYCLE PUSHING DEVICE

BACKGROUND OF THE INVENTION

1. Field of the Invention

The present invention relates to tricycle pushing devices and more particularly pertains to a new tricycle pushing device for pushing a child's tricycle therewith.

2. Description of the Prior Art

The use of tricycle pushing devices is known in the prior art. More specifically, tricycle pushing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,217,240; U.S. Pat. No. 5,531,494; U.S. Pat. No. 5,306,030; U.S. Pat. No. 5,558,348; U.S. Pat. No. Des. 339,090; and U.S. Pat. No. 4,659,124.

While these devices fulfill their respective, particular objectives and requirements, the aforementioned patents do not disclose a new tricycle pushing device. The inventive device includes an elongate shaft having opposite proximal and distal ends with a pushing head coupled to the distal end of the shaft. The pushing head has a generally U-shaped upper portion and a lower portion. The upper portion of the pushing head comprises a spaced apart and substantially parallel pair of elongate fingers defining a generally U-shaped slot therebetween designed for receiving therein a rear post of a tricycle. The lower portion of the pushing head has front, intermediate and rear regions. The front and rear regions are spaced apart from one another to define a space therebetween designed for receiving therein a perimeter lip downwardly depending from a foot kick plate of a tricycle.

In these respects, the tricycle pushing device according to the present invention substantially departs from the conventional concepts and designs of the prior art, and in so doing provides an apparatus primarily developed for the purpose of pushing a child's tricycle therewith.

SUMMARY OF THE INVENTION

In view of the foregoing disadvantages inherent in the known types of tricycle pushing devices now present in the prior art, the present invention provides a new tricycle pushing device construction wherein the same can be utilized for pushing a child's tricycle therewith.

The general purpose of the present invention, which will be described subsequently in greater detail, is to provide a new tricycle pushing device apparatus and method which has many of the advantages of the tricycle pushing devices mentioned heretofore and many novel features that result in a new tricycle pushing device which is not anticipated, rendered obvious, suggested, or even implied by any of the prior art tricycle pushing devices, either alone or in any combination thereof.

To attain this, the present invention generally comprises an elongate shaft having opposite proximal and distal ends with a pushing head coupled to the distal end of the shaft. The pushing head has a generally U-shaped upper portion and a lower portion. The upper portion of the pushing head comprises a spaced apart and substantially parallel pair of elongate fingers defining a generally U-shaped slot therebetween designed for receiving therein a rear post of a tricycle. The lower portion of the pushing head has front, intermediate and rear regions. The front and rear regions are spaced apart from one another to define a space therebetween designed for receiving therein a perimeter lip downwardly depending from a foot kick plate of a tricycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tricycle pushing device apparatus and method which has many of the advantages of the tricycle pushing devices mentioned heretofore and many novel features that result in a new tricycle pushing device which is not anticipated, rendered obvious, suggested, or even implied by any of the prior art tricycle pushing devices, either alone or in any combination thereof.

It is another object of the present invention to provide a new tricycle pushing device which may be easily and efficiently manufactured and marketed.

It is a further object of the present invention to provide a new tricycle pushing device which is of a durable and reliable construction.

An even further object of the present invention is to provide a new tricycle pushing device which is susceptible of a low cost of manufacture with regard to both materials and labor, and which accordingly is then susceptible of low prices of sale to the consuming public, thereby making such tricycle pushing device economically available to the buying public.

Still yet another object of the present invention is to provide a new tricycle pushing device which provides in the apparatuses and methods of the prior art some of the advantages thereof, while simultaneously overcoming some of the disadvantages normally associated therewith.

Still another object of the present invention is to provide a new tricycle pushing device for pushing a child's tricycle therewith.

Yet another object of the present invention is to provide a new tricycle pushing device which includes an elongate shaft having opposite proximal and distal ends with a pushing head coupled to the distal end of the shaft. The pushing head has a generally U-shaped upper portion and a lower portion. The upper portion of the pushing head comprises a spaced apart and substantially parallel pair of elongate fingers defining a generally U-shaped slot therebetween designed for receiving therein a rear post of a tricycle. The lower portion of the pushing head has front, intermediate and rear regions. The front and rear regions are spaced apart from one another to define a space therebetween designed for receiving therein a perimeter lip downwardly depending from a foot kick plate of a tricycle.

Still yet another object of the present invention is to provide a new tricycle pushing device that lets an adult user push a child's tricycle without having to bend down.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of a first embodiment of the pushing head of the present invention in use.

FIG. 4 is a schematic enlarged partial perspective view of a portion of the shaft of the present invention.

FIG. 5 is a schematic cross sectional view of a second embodiment of the pushing head of the present invention in use.

FIG. 6 is a schematic cross sectional view of a third embodiment of the pushing head of the present invention in use.

DESCRIPTION OF THE PREFERRED EMBODIMENT

Figure 1:
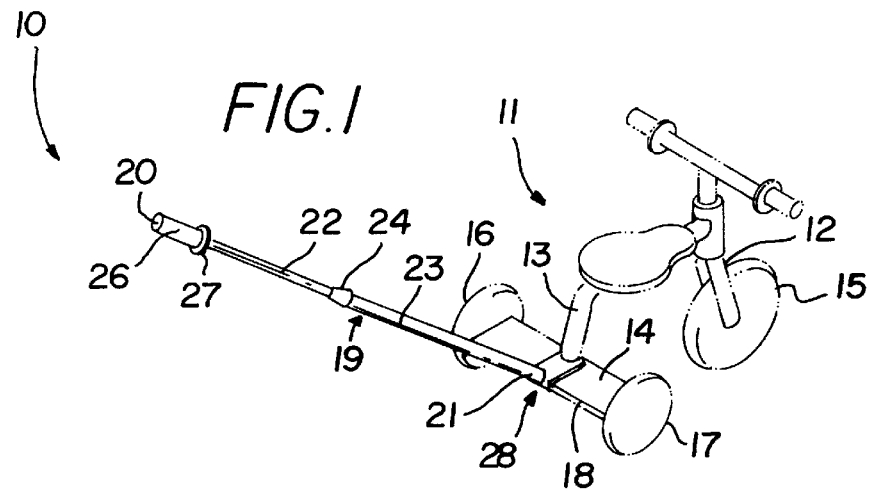
FIG. 1 is a schematic perspective view of a new tricycle pushing device in use according to the present invention.

With reference now to the drawings, and in particular to FIGS. 1 through 6 thereof, a new tricycle pushing device embodying the principles and concepts of the present invention and generally designated by the reference numeral 10 will be described.

As best illustrated in FIGS. 1 through 6, the tricycle pushing device 10 generally comprises an elongate shaft having opposite proximal and distal ends with a pushing head coupled to the distal end of the shaft. The pushing head has a generally U-shaped upper portion and a lower portion. The upper portion of the pushing head comprises a spaced apart and substantially parallel pair of elongate fingers defining a generally U-shaped slot therebetween designed for receiving therein a rear post of a tricycle. The lower portion of the pushing head has front, intermediate and rear regions. The front and rear regions are spaced apart from one another to define a space therebetween designed for receiving therein a perimeter lip downwardly depending from a foot kick plate of a tricycle.

In use, the tricycle pushing device 10 is designed for pushing a tricycle 11 having a frame including a front fork 12, a back post 13, and a foot kick plate 14 coupled to a bottom end of the back post. The front fork of the tricycle has a ground engaging front wheel 15 rotatably mounted thereto. The foot kick plate has a pair of ground engaging rear wheels 16,17 rotatably mounted thereto. The foot kick plate preferably has a perimeter lip 18 downwardly depending therearound, the perimeter lip has a rear portion along a back edge of the foot kick plate.

In closer detail, the pushing device includes an elongate and preferably tubular shaft 19 having opposite proximal and distal ends 20,21. In one embodiment, the shaft may be telescopically extendable and has elongate proximal and distal portions 22,23. The proximal portion of the shaft is positioned adjacent the proximal end of the shaft and the distal portion of the shaft is positioned adjacent the distal end of the shaft. Preferably, the distal portion of the shaft telescopically receives the proximal portion of the shaft therein. With particular reference to FIG. 4, the shaft may even have a tightening sleeve 24 rotatably disposed therearound for releasably holding the proximal portion in a fixed position with respect to the distal portion of the shaft. In one embodiment, the tightening sleeve may have a knurled outer surface 25 for frictionally enhancing user contact therewith.

The proximal end of the shaft may have a handgrip 26 preferably comprising a resiliently deformable material. In one embodiment, the handgrip may have an outwardly radiating hand guard 27 for preventing a user's hand from slipping down the shaft.

A pushing head 28 is coupled to the distal end of the shaft. In use, the pushing head is designed for engaging the back post and foot kick plate of a tricycle. The pushing head has a generally U-shaped planar upper portion 29 and a lower portion 30.

In one preferred embodiment, the pushing head has a planar middle portion 31 interposed between the upper and lower portions of the pushing head. The middle portion of the pushing head is connected to the distal end of the shaft to couple the pushing head to the distal end of the shaft. In such an embodiment, the upper portion of the pushing head may be extended at an obtuse angle to the middle portion of the pushing head.

Figure 2:
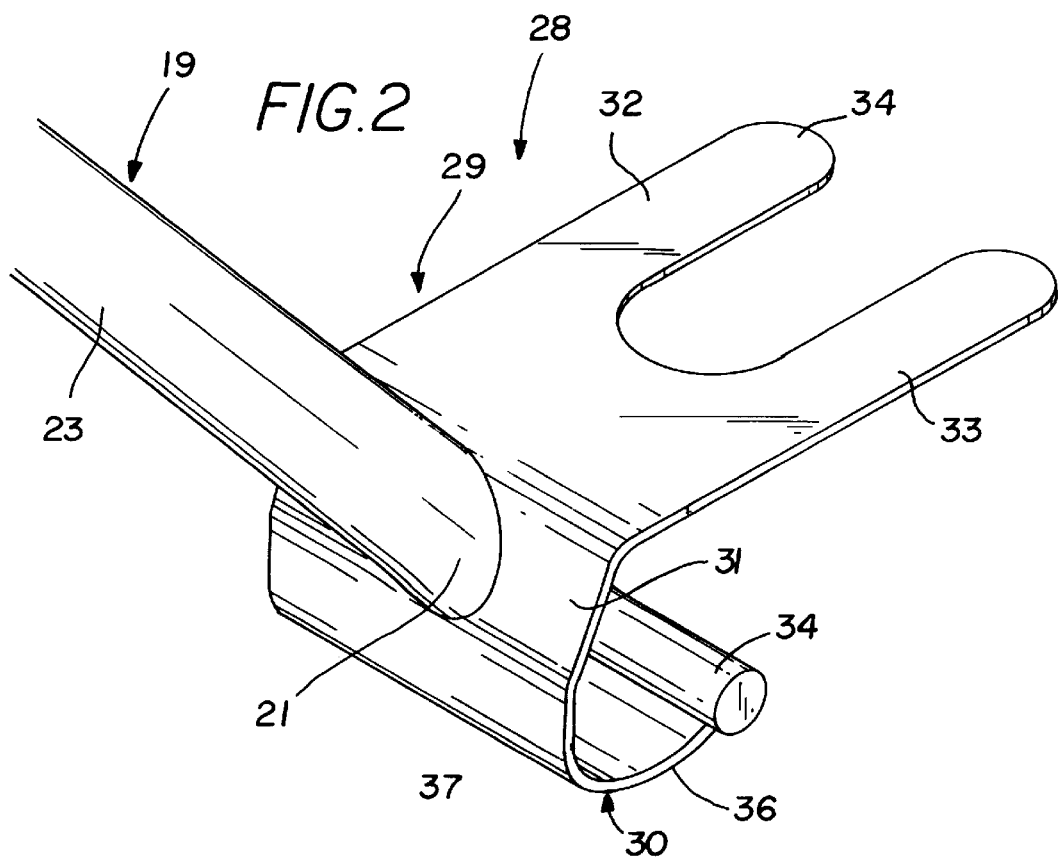
FIG. 2 is a schematic enlarged partial perspective view of a distal region of the present invention.

As best illustrated in FIG. 2, the upper portion of the pushing head comprises a spaced apart and substantially parallel pair of elongate fingers 32,33 defining a generally U-shaped slot therebetween. In use, the slot of the upper portion is designed for receiving therein the rear post of a tricycle therein such that the rear post is interposed between the fingers of the upper portion and abuts an arcuate end region of the periphery of the slot of the upper portion. In a preferred embodiment, the fingers of the upper portion each may terminate at a rounded tip 34 for preventing scratching to the rear post of the tricycle with the fingers.

The lower portion of the pushing head is preferably resiliently deflectable and has front, intermediate and rear regions 35,36,37. The intermediate region 36 of the lower portion is interposed between the front and rear regions 35,37 of the lower portion. Preferably, the rear region of the lower portion is substantially planar and is connected to the middle portion of the pushing head. Ideally, the rear region of the lower portion may be extended at an obtuse angle to the middle portion of the pushing head.

The intermediate region of the lower portion is spaced apart from the upper portion of the pushing head. Preferably, the intermediate region of the lower portion is arcuate in shape and has an upwardly facing concavity facing towards the upper portion of the pushing head.

With reference to FIGS. 2 and 3, in one embodiment, the front region of the lower portion may have a generally cylindrical dowel shaped configuration with an outer diameter greater than the thickness of the rest of the lower portion.

With reference to FIG. 5, in another embodiment, the front region of the lower portion may be substantially planar and extended substantially parallel to the rear region of the lower portion and extended generally perpendicularly upwards from the intermediate region of the lower portion.

With reference to FIG. 6, in a third embodiment, the front region of the lower portion may be arcuate in shape and have a rearwardly facing concavity facing towards the rear region of the lower portion and is continuous with the concavity of the intermediate region.

In use, the front portions of all of the embodiments of the lower portion are each designed for upwardly extending in front of a rear portion of the perimeter lip downwardly depending along a back edge of the foot kick plate of a tricycle such that the rear portion of the perimeter lip is positioned between the front and rear regions of the lower portion. The dowel embodiment and arcuate embodiment of the front region of the lower portion are designed for engaging the rear portion of perimeter lip to help prevent the lower portion of the pushing head from slipping off of the foot kick plate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A tricycle pushing device, comprising:
   an elongate shaft having opposite proximal and distal ends;
   a pushing head being coupled to said distal end of said shaft;
   said pushing head having a generally U-shaped upper portion and a lower portion;
   said upper portion of said pushing head comprising a spaced apart and substantially parallel pair of elongate fingers defining a generally U-shaped slot therebetween adapted for receiving therein a rear post of a tricycle;
   said lower portion of said pushing head having front, intermediate and rear regions, said front and rear regions being spaced apart from one another to define a space therebetween adapted for receiving therein a perimeter lip downwardly depending from a foot kick plate of a tricycle; and
   wherein said front region of said lower portion has a generally cylindrical configuration.

2. The tricycle pushing device of claim 1, wherein said shaft is telescopically extendable.

3. The tricycle pushing device of claim 1, wherein said proximal end of said shaft has a handgrip.

4. The tricycle pushing device of claim 1, wherein said pushing head has a planar middle portion interposed between said upper and lower portions of said pushing head, said middle portion of said pushing head being connected to said distal end of said shaft to couple said pushing head to said distal end of said shaft.

5. The tricycle pushing device of claim 4, wherein said upper portion of said pushing head is extended at an obtuse angle to said middle portion of said pushing head.

6. The tricycle pushing device of claim 4, wherein said rear region of said lower portion is extended at an obtuse angle to said middle portion of said pushing head.

7. The tricycle pushing device of claim 1, wherein said lower portion of said pushing head is resiliently deflectable.

8. A tricycle pushing device, comprising:
   an elongate shaft having opposite proximal and distal ends;
   a pushing head being coupled to said distal end of said shaft;
   said pushing head having a generally U-shaped upper portion and a lower portion;
   said upper portion of said pushing head comprising a spaced apart and substantially parallel pair of elongate fingers defining a generally U-shaped slot therebetween adapted for receiving therein a rear post of a tricycle;
   said lower portion of said pushing head having front, intermediate and rear regions, said front and rear regions being spaced apart from one another to define a space therebetween adapted for receiving therein a perimeter lip downwardly depending from a foot kick plate of a tricycle; and
   wherein said front region of said lower portion is substantially planar and extended substantially parallel to said rear region of said lower portion.

9. The tricycle pushing device of claim 8, wherein said shaft is telescopically extendable.

10. The tricycle pushing device of claim 8, wherein said proximal end of said shaft has a handgrip.

11. The tricycle pushing device of claim 8, wherein said pushing head has a planar middle portion interposed between said upper and lower portions of said pushing head, said middle portion of said pushing head being connected to said distal end of said shaft to couple said pushing head to said distal end of said shaft.

12. The tricycle pushing device of claim 11, wherein said upper portion of said pushing head is extended at an obtuse angle to said middle portion of said pushing head.

13. The tricycle pushing device of claim 11, wherein said rear region of said lower portion is extended at an obtuse angle to said middle portion of said pushing head.

14. A tricycle pushing device, comprising:
   an elongate shaft having opposite proximal and distal ends;
   a pushing head being coupled to said distal end of said shaft;

said pushing head having a generally U-shaped upper portion and a lower portion;

said upper portion of said pushing head comprising a spaced apart and substantially parallel pair of elongate fingers defining a generally U-shaped slot therebetween adapted for receiving therein a rear post of a tricycle;

said lower portion of said pushing head having front, intermediate and rear regions, said front and rear regions being spaced apart from one another to define a space therebetween adapted for receiving therein a perimeter lip downwardly depending from a foot kick plate of a tricycle; and wherein said front region of said lower portion is arcuate in shape and having a rearwardly facing concavity facing towards said, rear region of said lower portion.

15. The tricycle pushing device of claim 14, wherein said shaft is telescopically extendable.

16. The tricycle pushing device of claim 14, wherein said proximal end of said shaft has a handgrip.

17. The tricycle pushing device of claim 14, wherein said pushing head has a planar middle portion interposed between said upper and lower portions of said pushing head, said middle portion of said pushing head being connected to said distal end of said shaft to couple said pushing head to said distal end of said shaft.

18. The tricycle pushing device of claim 17, wherein said upper portion of said pushing head is extended at an obtuse angle to said middle portion of said pushing head.

19. The tricycle pushing device of claim 17, wherein said rear region of said lower portion is extended at an obtuse angle to said middle portion of said pushing head.

* * * * *